Sept. 4, 1951 — O. GOBEIL — 2,567,107
AUTOMATIC CUTTING DEPTH REGULATOR FOR PLOWS
Filed July 8, 1947
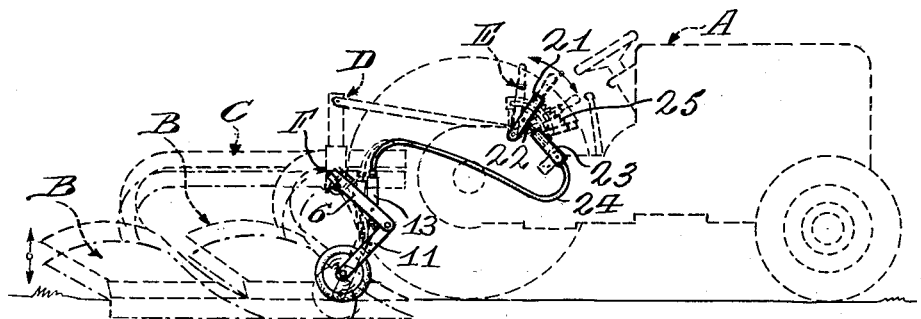
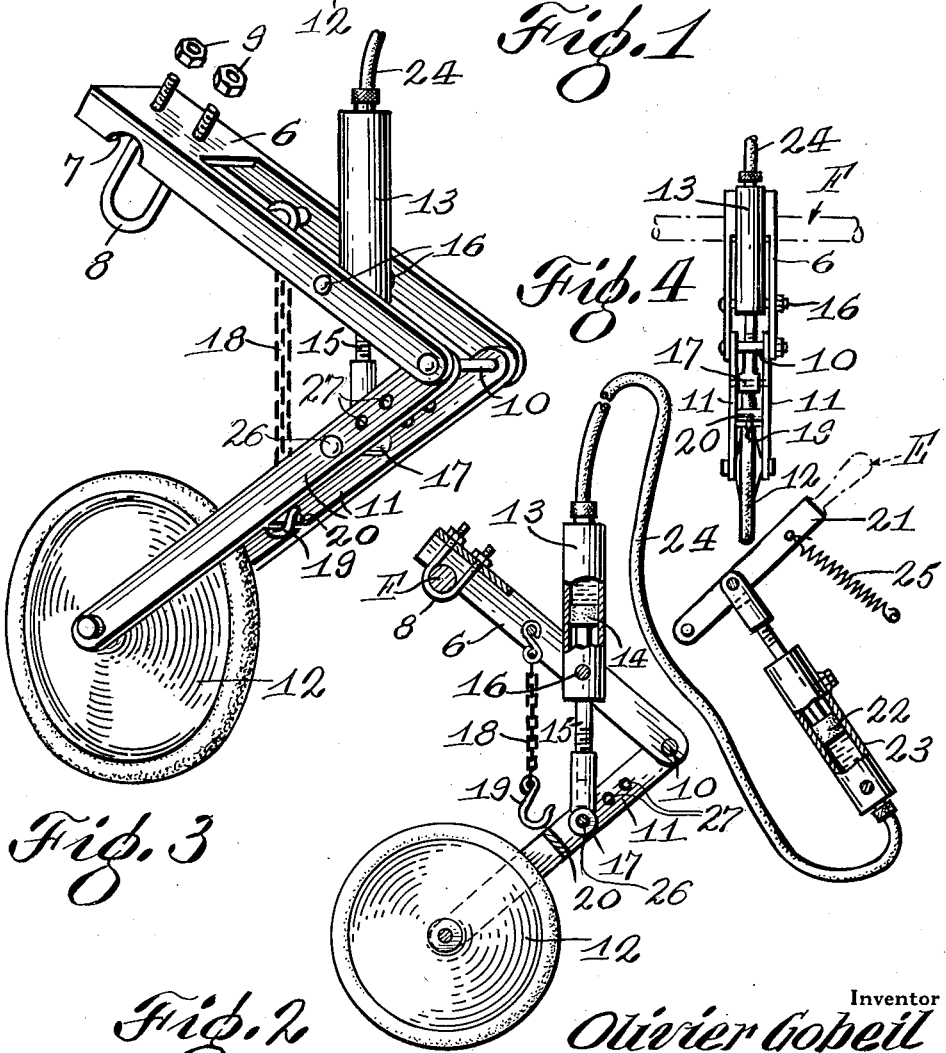
Inventor
Olivier Gobeil
By
Attorneys Patented Sept. 4, 1951

2,567,107

UNITED STATES PATENT OFFICE 2,567,107

AUTOMATIC CUTTING DEPTH REGULATOR FOR PLOWS

Olivier Gobeil, Chicoutimi, Quebec, Canada

Application July 8, 1947, Serial No. 759,527
In Canada July 8, 1946

2 Claims. (Cl. 97—50)

The present invention relates to a device for regulating the cutting depth of power-operated ploughs, and is particularly concerned with the application of such a device to a tractor-drawn hydraulically-operated plough.

In plowing, nowadays, the plough is usually drawn behind a power vehicle and is raised or lowered by a power unit controlled by the vehicle operator. Since it is desirable to cut furrows of a certain constant depth for seeding purposes, and since the ground to be worked usually has an undulating or irregular surface, it becomes necessary for the operator to always keep his eye on the trailing ploughshares and be constantly adjusting the level at which they work. Such a task is not only fatiguing, but it is extremely difficult to accomplish properly, since the operator is invariably a little behindhand in his adjustments. Also the necessity of accomplishing this task means that the vehicle must be kept to a relatively slow pace, and as a result, much valuable time is lost in often unrewarded effort.

The present invention, then, has for its main object the provision of means for automatically regulating the cutting depth of a plough in accordance with the irregularities of the surface to be worked.

A further object resides in the provision of means of the character described which are readily applicable to present power control systems for ploughs.

Still another object resides in the provision of means of the character described which are relatively inexpensive to manufacture and install.

Yet another object resides in the provision of means of the character described which are simple and foolproof in operation, and not subject to excessive wear or shock.

Other objects and advantages will become apparent, or be further pointed out in the description to follow.

As an example, and for purposes of illustration only, the annexed drawing shows a preferred embodiment of the invention such as may be used with existing systems of power-controlled ploughs. In this drawing, Figure 1 shows, in heavy outline, the equipment of the invention as associated with a tractor-drawn plough, the latter shown in broken outline;

Figure 2 shows a detail of the invention illustrating its operation;

Figure 3 shows a perspective view of the ground-engaging and correction-transmitting equipment of the invention, and Figure 4 shows a front elevation of this equipment.

Referring to the drawing, wherein the same reference characters denote corresponding parts throughout, it is seen that the invention is associated generally with a tractor A, the ploughshares B which are controlled behind the tractor by the arms C, and some sort of power mechanism D for elevating and depressing these arms. An operator's lever, such as E is provided with the power mechanism in order to adjust the cutting depth of the plough or to raise it to an inoperative position.

Briefly speaking, the present invention alters the foregoing system by providing a ground engaging device which automatically transmits an adjustment to the operating lever to compensate for irregularities in the surface of the ground. In this way, the tractor operator may concentrate on his driving and need not be continually facing to the rear and correcting the position of the control lever.

The ground-engaging equipment may be secured to the plough-frame on the cross-tree F between the arms C. The fixed member of the equipment is shown as a forked frame 6, this frame having a transverse cross-tree-engaging groove 7 and being secured to the frame by a U-bolt 8 and nuts 9 or any suitable means. The lower extremity of frame 6 is pivotally held, by pin 10, to a further forked member 11, and this latter has a ground-engaging wheel 12 rotatably mounted between the bottom ends thereof.

Since the frame 6 is rigidly held by the plough, irregularities in the working surface will cause vertical displacements of wheel 12 and hence variations of the angle between members 6 and 11. In order to take advantage of these variations, a cylinder 13 and piston 14 slidable therein are provided.

The cylinder 13 is pivotally held in frame 6 at its lower end as by means of a pin 16, the piston rod 15 emerging from the cylinder at this end and being pivotally secured to member 11 as by means of a T-shaped sleeve 17 threadedly engaging the threaded end of the piston rod 15 and pivotally mounted on a pin 26 itself extending between the legs of the forked member 11. Thus a variation of the angle between the members 6 and 11 will cause a corresponding displacement of piston 14 in cylinder 13.

In order to hold the ground-engaging member in raised, inoperative position when the plough is not working, a chain 18 is provided, this chain being secured to frame 6 and having a hooked lower end 19 engageable with a transverse bar 20 of member 11.

At the operator's lever E, equipment is provided to adjust this handle by an amount proportional to the displacement of piston 14. This equipment includes, in the preferred embodiment, an auxiliary lever 21, a cylinder 23 and a piston 22.

The auxiliary lever 21 is pivotable on the same axis as the operator's lever E, and may be clamped to move relatively therewith. The rod of piston 22 is pivotally secured to lever 21 and controls the movement thereof. The piston is slidable in cylinder 23 and the latter is pivotally secured to the tractor frame.

A flexible tube 24 is coupled to cylinders 13 and 23 at their ends opposite the pistons, and the system is filled with a fluid suitable for purposes of hydraulic transmission. Hence any displacement of piston 14 will result in a corresponding displacement of piston 22, which in turn will actuate the auxiliary lever 21. Thus piston 14 and cylinder 13 form the transmitter of the hydraulic system whereas piston 22 and cylinder 23 form the receiver.

The operating procedure of the invention may be simply described as follows:

Upon commencing work, the operator moves his lever in order to set the ploughshares to the required cutting depth. The hook of chain 18 is then disengaged in order to allow the wheel 12 to descend to ground-engaging position. This causes the auxiliary lever 21 to take up a certain position. The two levers 21 and E are then clamped in this relative position and subsequently are movable in unison. Now as the tractor and plough traverse an irregular terrain, the transmission of the vertical movements of wheel 12 as displacements of piston 22 forces the lever 21 (and hence lever E) to operate the power control unit so as to make the plough move vertically an amount corresponding to the movement of wheel 12.

It will be understood that if an undulation of the working surface causes upward displacement of wheel 12 relative to the plough, the weight of the former should be sufficient to bring it down again as the ground becomes depressed. Nevertheless, in order to ensure that such is always the case, a spring 25 is provided which, being affixed to handle 21 and the tractor frame, ensures that this handle will always tend to force wheel 12 downwards through the hydraulic system. The wheel will thus be continually in engagement with the working surface.

A unique feature of the invention resides in the ability to speed up or slow down the correction applied to the cutting-depth of the plough. This is accomplished by adjusting the angle of inclination of frame 6 so as to move wheel 12 forward or backward, as desired.

As a further aid to proper adjustment of the control levers of the plough, thus giving these levers maximum corrective play, member 11 is provided with a plurality of apertures 27 by which the piston rod 15 may be secured thereto. Thus the point 17, at which this connection between member 11 and rod 15 is made, may be moved up or down the member, as desired. In addition, the piston rod 15 and that of piston 22 might in some cases be made of adjustable length, as shown in Figure 2; and such a construction would provide further means for setting the mechanism to produce optimum results.

There can be no doubt that, by means of the exceedingly simple principles utilized as shown and described herein, the present invention gives rise to a great improvement in ploughing. Not only does it make such work less arduous and time-consuming, but it also permits of more satisfactory results. The process of adjusting the cutting depth of a plough is not subject to the vagaries of human control, but rather is carried out by a continuous, automatic process having nearly instantaneous response. And the equipment utilized to perform this improved method of operation is of a design which may be applied to all existing types of power-controlled ploughs, whilst remaining simple and inexpensive.

It will be understood that various changes as to size, shape, and arrangement of parts may be resorted to, or other alterations towards fulfilment of the foregoing objectives, without departing from the spirit of the invention or the scope of the subjoined claims.

Having thus described my invention, I claim:

1. As an attachment to a vehicle and to a ground working implement movably connected thereto and power operated thereby, said vehicle having a control lever for controlling the vertical displacement of said implement, a control for the automatic regulation of the working depth of said implement comprising an elongated frame member adjustably secured to said implement, being movable in the longitudinal vertical plane of the latter, a ground-engaging lever hinged to said frame member, an auxiliary lever mounted on the axis of said control lever, clampable to the latter in adjusted angular relation and movable therewith, a pair of hydraulically-coupled cylinder and piston systems forming a transmitter and a receiver, the cylinder of said transmitter being pivotally mounted on said frame member, the piston in said cylinder being adjustably connected to said ground engaging lever at a variable distance from the hinge connection of the latter to said frame member, the cylinder of said receiver being mounted on said vehicle and the piston in said latter cylinder being connected to said auxiliary lever.

2. As an attachment to a vehicle and to a ground working implement movably connected thereto and power operated thereby, said vehicle having a control lever for controlling the vertical displacement of said implement, a control for the automatic operation of said control lever to regulate the working depth of said implement comprising an elongated frame member adjustably secured at one end to said implement to vary its inclination relatively to the latter, a ground-engaging lever hinged at the free end of said frame member and extending at an angle relatively thereto, an auxiliary lever mounted on the axis of said control lever, clampable to the latter in adjusted angular relation and movable therewith, a pair of hydraulically-coupled cylinder and piston systems forming a transmitter and a receiver, the cylinder of said transmitter being pivotally mounted intermediate the ends of said frame member, the piston in said cylinder being adjustably connected to said ground engaging lever at a variable distance from the hinge connection of the latter to said frame member, the cylinder of said receiver being mounted on said vehicle and the piston in said latter cylinder being connected to said auxiliary lever, a flexible tube connecting said cylinders and hydraulic fluid in said tube and cylinders.

OLIVIER GOBEIL.

REFERENCES CITED

The following references are of record in the file of this patent:

UNITED STATES PATENTS

| Number | Name | Date |
|---|---|---|
| 534,403 | Mechwart | Feb. 19, 1895 |
| 2,023,053 | Kugel | Dec. 3, 1935 |
| 2,249,807 | Brown | July 22, 1941 |
| 2,318,194 | Brown | May 4, 1943 |
| 2,334,455 | Thomas | Nov. 16, 1943 |
| 2,405,334 | Silver | Aug. 6, 1946 |
| 2,410,918 | Acton | Nov. 12, 1946 |

FOREIGN PATENTS

| Number | Country | Date |
|---|---|---|
| 519,394 | Great Britain | Mar. 26, 1940 |
| 541,436 | Great Britain | Nov. 26, 1941 |